United States Patent Office 3,433,524
Patented Mar. 18, 1969

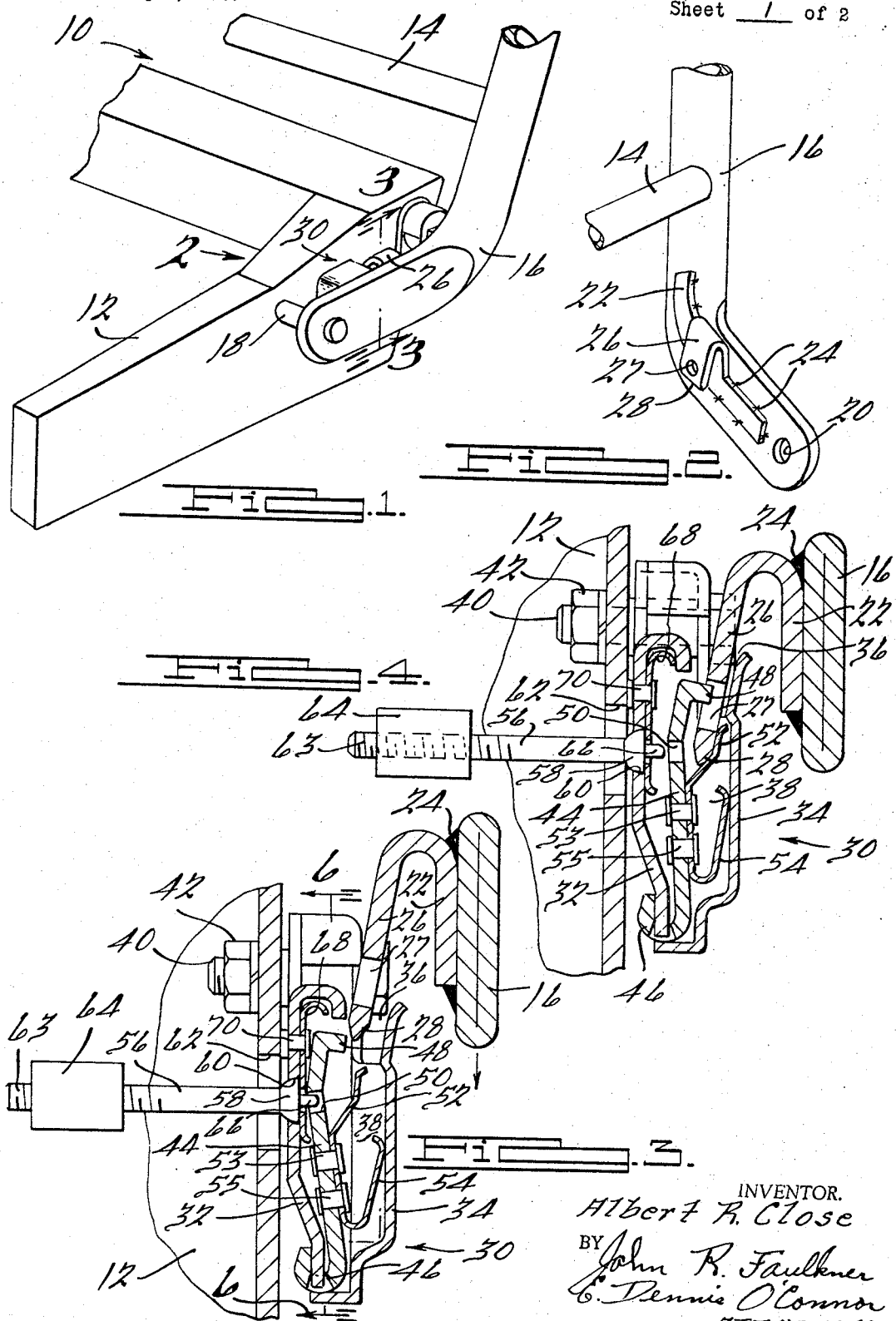

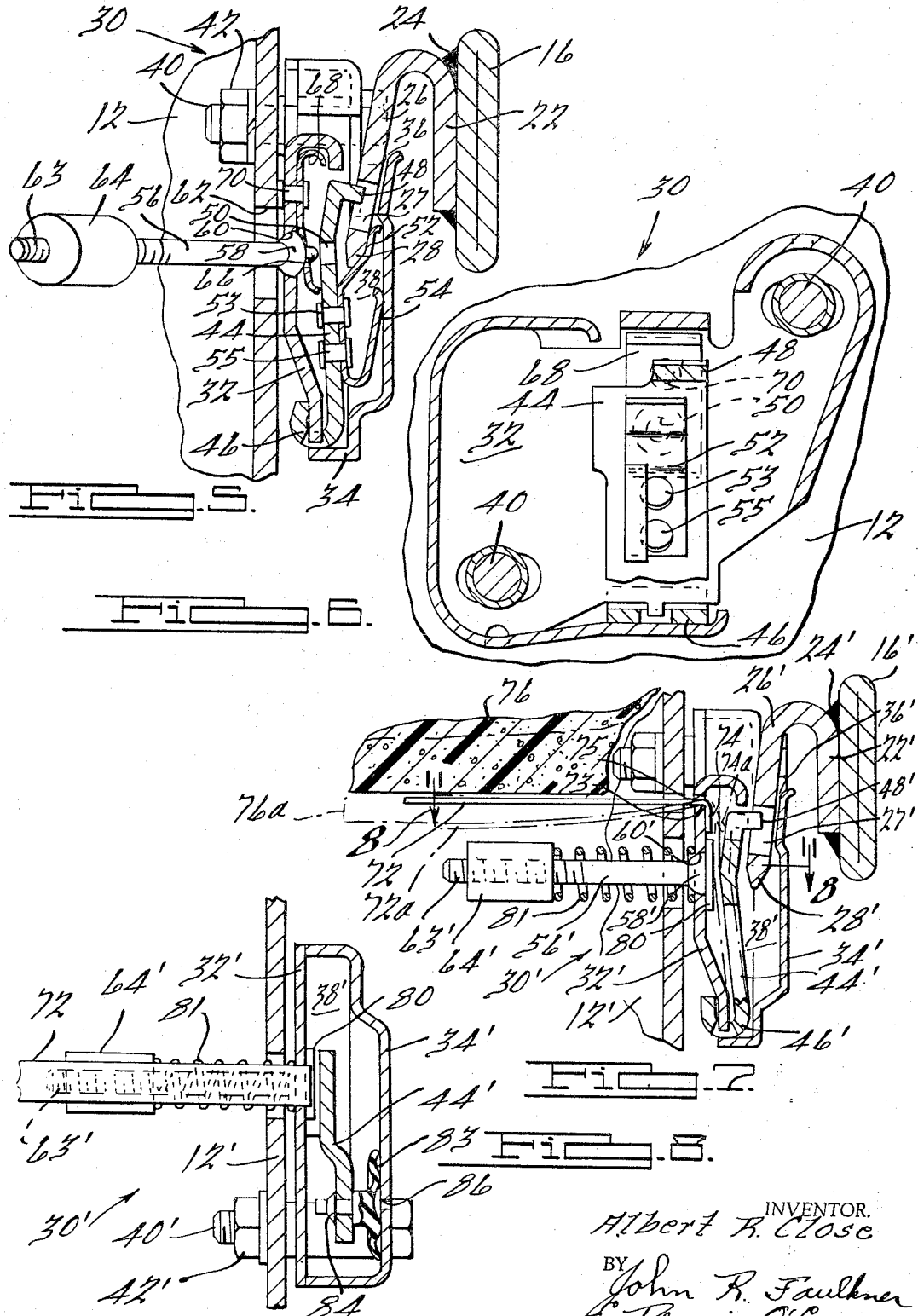

3,433,524
SEAT BACK LATCH MECHANISM
Albert R. Close, Oak Park, Mich., assignor to Ford Motor Company, Dearborn, Mich., a corporation of Delaware
Filed May 2, 1967, Ser. No. 635,492
U.S. Cl. 296—65
Int. Cl. B60n 1/02; A47c 3/00, 7/60
9 Claims

ABSTRACT OF THE DISCLOSURE

A mechanism for latching a pivotally mounted vehicle seat back relative to a horizontal seat member. A first embodiment of latch mechanism includes primary inertia retaining means that prohibit sudden seat back movement as occurs during rapid vehicle deceleration, while permitting normal manually activated movement. A second embodiment includes weight sensitive retaining means preventing seat back movement while the seat is occupied by a passenger. Both embodiments include secondary retaining means preventing relative seat back movement during periods of change in vehicle velocity.

Background of the invention

The prior art, typified by U.S. Patent 2,559,548 issued July 3, 1951, discloses the use of a releasable latch mechanism for holding the pivoted or folding seat back of certain motor vehicle seat assemblies, such as those utilized in two-door models, against movement relative to the horizontal seat member. Obviously, such an arrangement contributes to the stability of vehicle passengers carried by the seat assembly as well as rear seat passengers during accident or so-called "panic stop" conditions. Manually operable control means conventionally are provided for releasing the latch mechanism when ingress or egress of rear seat passengers is desired. Such control means may prove bothersome and cumbersome to operate.

This invention provides a first embodiment of seat back latch mechanism including primary inertia retaining means that allow normal, manually motivated movement of the seat back, but prevent sudden or jerky movement as would occur during an accident or panic stop. A second embodiment of this invention includes weight sensitive retaining means preventing seat back movement while a passenger is seated on the seat assembly. Both embodiments include secondary retaining means preventing relative seat back movement during periods of change in vehicle velocity. This invention thus provides for automatic latching of the seat back against movement when necessary for passenger safety, but allows normal seat back movement when desired without the necessity for manual manipulation of a latch control.

Brief summary of the invention

A seat back latch mechanism constructed in accordance with this invention is utilized in combination with a vehicle seat assembly having a substantially horizontal seat member and a seat back member pivotally secured to the seat member. Cooperating latch means are carried by each of these members for limiting movement of the seat back member relative to the seat member. The latch means include a latch element operatively secured to one of the members and having an aperture formed therein and adapted to receive detent means operatively secured to the other of the members for pivotal movement from a first position remote from the latch element to a second position engaging the latch element and partially received in the latch element aperture. Intermittently energizable first resilient means are operatively connected to the detent means and have an operative condition exerting a force urging the detent means toward the second position. Second resilient means are operatively connected to the detent means and exert a force biasing the detent means toward the first position. The force exerted by the first detent means, however, is greater than and overcomes the force exerted by the second detent means.

Brief description of the drawings

FIGURE 1 is a partial isometric view of a motor vehicle seat frame including a first embodiment of latch mechanism constructed in accordance with this invention;

FIGURE 2 is an isometric view of a portion of the structure of FIGURE 1 taken along the line of sight represented by the arrow 2 of FIGURE 1;

FIGURE 3 is a sectional view taken along the line 3—3 of FIGURE 1 illustrating the latch mechanism of FIGURE 1 in the unlatched position;

FIGURE 4 is a view similar to FIGURE 3 but illustrating the latch mechanism in the latched position;

FIGURE 5 is a view similar to FIGURE 4 but illustrating the operation of the secondary latch retaining means of the latch mechanism;

FIGURE 6 is a sectional view taken along the line 6—6 of FIGURE 3;

FIGURE 7 is a sectional view similar to FIGURE 4 of a second embodiment of this invention including a portion of the seat assembly cushion; and FIGURE 8 is a sectional view taken along the line 8—8 of FIGURE 7.

Detailed description of the invention

Referring now in detail to the drawings and in particular to FIGURES 1 and 2, the numeral 10 denotes a motor vehicle seat assembly frame having a substantially horizontal seat member 12 and a seat back member 14 including a conventional hockey stick 16. The seat back member 14 is movable relative to seat member 12 in that hockey stick 16 is pivotally attached to member 12 by a pivot pin 18 extending into a hole 20 formed in the hockey stick. A latch member 22, having an integrally formed latch element 26, is secured by welds 24 to the interior surface of hockey stick 16. Latch element 26 has an aperture 27 formed therethrough and a tapered end 28. A latch element retaining assembly 30 is mounted on seat member 12 as will be discussed in detail below.

As may be seen from FIGURES 4-6, assembly 30 includes a housing formed from housing plates 32 and 34 and having an opening 36 therebetween giving access to a housing cavity 38. Bolts 40, passing through the housing plates and seat member 12, cooperate with nuts 42 to fasten the housing plates together as illustrated, and secure the composite housing to seat member 12.

A detent 44, having a curved end 46 pivotally secured between housing plates 32 and 34, is swingable within cavity 38. The end 48 of detent 44 remote from curved end 46 extends angularly from the main body of the detent. A hole 50 is formed through the main body of detent 44. A first leaf spring 52 is secured to detent 44 by rivet 53 and extends toward housing opening 36 and detent end 48. A second leaf spring 54 is secured to the detent by a rivet 55 and bears on housing plate 34, thereby exerting a force tending to move the detent in a counterclockwise direction as viewed in FIGURES 3–6. The spring constant of spring 52 is greater than the spring constant of spring 54.

A rod 56, having enlarged rounded portion 58 is pivotally mounted by enlarged portion 58 in a mating socket aperture 60 formed in plate 32. Rod 56 extends through an opening 62 in seat member 12 and has a threaded portion 63 upon which is threaded a mass 64. The end of rod 56 proximate enlarged portion 58 has a reduced diameter to form a pin 66 that projects through an aperture formed in a leaf spring 68. Spring 68 is secured by a rivet 70 to the internal wall of plate 32. Spring 68 bears on enlarged portion 58 and tends to maintain rod 56 at right angles to plate 32 as illustrated in FIGURES 3 and 4. When rod 56 is in this position, pin 66 registers with hole 50 formed through detent 44.

The operation of this device is as follows. Assembly 30 and latch member 22 are so arranged that when the seat back is in a position to seat a passenger, latch element 26 extends through opening 36 and into cavity 38. When the seat back member is tilted forwardly giving access to the vehicle rear seat, the force exerted by spring 54 on detent 44 forces the detent into the position illustrated in FIGURE 3. As latch element 26 moves into cavity 38, tapered end 28 contacts and deforms spring 52 so that this spring exerts a force overcoming the force of spring 54 and urging detent 44 clockwise so that end 48 extends into aperture 27 (FIGURE 4). The force of spring 52 overcomes the force of spring 54 because of the spring constant relationship set forth above.

If the seat back is pivoted forward slowly, latch element 26 will be withdrawn slowly through opening 36, latch end 28 will cease contact with spring 52 and spring 54 will motivate detent 44 counterclockwise before engagement between detent projection 48 and the bottom wall of aperture 27. If, however, a sudden jerky movement of the seat back is accomplished, as in an accident, and latch element 26 moves upward quickly, the elapsed time between the disengagement of tapered end 28 and spring 52 is too brief to permit the force of spring 54 to move detent 44 sufficiently to remove projection 48 from aperture 27. Projection 48 therefore will engage the bottom wall of aperture 27 preventing further movement of the latch element and, correspondingly, the seat back.

It may thus be seen that the engagement of detent 44 and latch element 26 prevents sudden or jerky movement of seat back 14. However, the engagement of these parts as described above may be insufficient to prevent seat back movement during an accident if a gradual deceleration of the vehicle precedes the accident. This possibility is enhanced if the seat assembly is unoccupied, as gradual forward movement of the seat back during such deceleration would allow this disengagement of detent 44 and latch element 26 prior to the crash. This eventually is anticipated and negated, however, by the secondary inertia retaining means included in this latch mechanism.

Rounded enlargement 58 of rod 56 and mating aperture 60 in plate 32 form a type of ball and socket connection allowing swinging movement of rod 56 that is prevented during periods of constant vehicle velocity by the force of spring 68. During periods of change in vehicle velocity such as the deceleration described above, however, the inertia of mass 64, and to a lesser degree rod 56, causes an angular displacement of rod 56 (FIGURE 5) relative to plate 32. Pin 66 thus is no longer in registry with hole 50. Counterclockwise movement of detent 44 (as viewed in FIGURE 5) is prevented by contact between pin 66 and the surface of detent 44. It may thus be seen that disengagement of the latch mechanism described above may be accomplished only by relatively slow pivotal movement of the seat back during periods of constant vehicle velocity.

FIGURES 7 and 8, wherein parts like parts of preceding figures are identified by like but "primed" reference numerals, illustrate a second embodiment of this invention.

Retention assembly 30' includes, for primary motivation of detent 44' so that detent projection 48' extends into aperture 27' of latch member 26', a leaf spring 72 having a substantially perpendicularly extending end 74 located within housing cavity 38'. Spring 72 extends through a hole 75 in plate 32' and beneath a resiliently deformable seat cushion 76 that may be sprung and/or made of resilient padding such as foam rubber.

Rod 56', having rounded enlargement 58' cooperating with a mating aperture 60' in plate 32' to form a ball and socket coupling, has a flange 80 on one end thereof located within cavity 38'. A compression spring 81 surrounds rod 56' and bears on plate 32' and mass 64' to maintain rod 56' at right angles to plate 32' during periods of constant vehicle velocity.

Detent 44' has secured thereto a suction cup 83 by a rivet 84. Suction cup 83 is, of course, formed from resilient material and is arranged to contact and be deformed against the interior wall of plate 34' about an orifice 86 when detent projection 48' extends within aperture 27'.

When a passenger is seated on cushion 76, the deflection of the cushion into the position 76a, illustrated in phantom, causes a corresponding deflection of spring 72 into the phantom position 72a. The contact point 73 between spring 72 and the bottom of hole 75 becomes a pivot point during this deflection of spring 72. Spring end 74 is thus forced from its normal position to the phantom position 74a where it bears on detent 44' and exerts a force causing movement of the detent so that projection 48' moves to a latching position within aperture 27'. This movement of detent 44' causes suction cup 83 to be deformed against plate 34' (FIGURE 8). When the passenger is no longer seated on cushion 76, the cushion, spring 72 and spring end 74 return to their original positions. Since orifice 86 admits atmospheric pressure to the space between suction cup 83 and plate 34', the suction cup returns to its original shape and in doing so exerts a force that urges detent 44' counterclockwise (FIGURE 7) into the unlatched position.

In the event no passenger is seated on cushion 76, seat back movement is prevented during periods of change in vehicle velocity by angular displacement of rod 56' due to inertial forces. Such forces overcome the force of spring 81 and rod displacement causes flange 80 to bear against detent 44, forcing the detent 44' counterclockwise so that projection 48' is received in aperture 27'.

It may thus be seen that the second embodiment of the latch mechanism of this invention illustrated in FIGURES 7 and 8 prevents relative seat back movement whenever a passenger is seated on the seat assembly and/or the vehicle is undergoing a change in velocity.

I claim:

1. A seat back latch mechanism for a vehicle seat assembly having a substantially horizontal seat member, a seat back member pivotally secured to said seat member, and cooperating latch means carried by each of said members for limiting movement of said seat back member relative to said seat member, the improvement comprising: said latch means including a latch element operatively secured to one of said members and having an aperture formed therein, detent means operatively secured to the other of said members for pivotal movement from a first position remote from said latch element to a second position engaging said latch element and received in said aperture, pressure responsive means urging said detent means into said second position upon the application of pressure thereto, resilient restoring means operatively connected to said detent means and urging said detent means toward said first position upon the termination of the pressure on said pressure responsive means, said latch element movable toward and away from said detent means, and said pressure being applied by a portion of said latch element contacting said pressure responsive means as the former moves toward said detent means.

2. A seat back latch mechanism for a vehicle seat assembly having a substantially horizontal seat member, a seat back member pivotally secured to said seat member, and cooperating latch means carried by each of said members for limiting movement of said seat back member relative to said seat member, the improvement comprising: said latch means including a latch element operatively secured to one of said members and having an aperture formed therein, detent means operatively secured to the other of said members for pivotal movement from a first position remote from said latch element to a second position engaging said latch element and received in said aperture, pressure responsive means urging said detent means into said second position upon the application of pressure thereto, resilient restoring means operatively connected to said detent means and urging said detent means toward said first position upon the termination of the pressure on said pressure responsive means, and inertia means operatively connected to the other of said members and sensing changes in vehicle velocity, said inertia means having a first position during constant vehicle velocity permitting movement of said detent means and a second position during changes of vehicle velocity maintaining said detent means in said second position.

3. A seat back latch mechanism for a vehicle seat assembly having a substantially horizontal seat member, a seat back member pivotally secured to said seat member, and cooperating latch means carried by each of said members for limiting movement of said seat back member relative to said seat member, the improvement comprising: said latch means including a latch element operatively secured to one of said members and having an aperture formed therein, detent means operatively secured to the other of said members for pivotal movement from a first position remote from said latch element to a second position engaging said latch element and received in said aperture, pressure responsive means urging said detent means into said second position upon the application of pressure thereto, resilient restoring means operatively connected to said detent means and urging said detent means toward said first position upon the termination of the pressure on said pressure responsive means, said detent means being pivotally secured to and movable within a housing secured to the other of said members, said housing having an opening therein to admit said latch element, said latch element movable into and out of said housing.

4. The mechanism of claim 3, wherein said resilient restoring means is secured to said detent means, is in a state of compression and bears against said housing.

5. The mechanim of claim 3, wherein said pressure responsive means comprises a spring secured to said detent member and located within said housing.

6. In a motor vehicle having a seat assembly comprising a substantially horizontal seat member, a seat back member pivotally secured to said seat member for movement relative thereto and a seat back latch mechanism having cooperating latch means carried by each of said members for limiting movement of said seat back member relative to said seat member, the improvement comprising: said latch means including a housing secured to said seat member and having an opening therein, a latch element secured to said seat back member for movement therewith from a position remote from said housing to a position wherein said latch element extends through said opening and into said housing, detent means pivotally mounted within said housing, said latch element having an aperture formed therein adapted to receive a portion of said detent means, first spring means carried by said detent means in the path of movement of said latch means and exerting a force on said detent means urging said portion into said aperture when said spring means is contacted by said latch element, and second spring means operatively connected to said detent means and exerting a force on said detent means urging said portion away from said aperture, the force exerted by said first spring means being greater than the force exerted by said second spring means.

7. The combination of claim 6, wherein said first spring means is contacted by said latch element only when said portion registers with said aperture, and the spring constant of said first spring means is greater than the spring constant of said second spring means.

8. The combination of claim 7, including inertia means operatively connected to said detent means and maintaining said portion in said aperture during periods of change in vehicle velocity.

9. The combination of claim 8, wherein said detent means has an aperture formed therein, said inertia means comprising a rod pivotally mounted by said housing, one end of said rod located proximate said detent means, a mass carried by the other end of said rod, resilient means biasing said rod into a first position during periods of constant vehicle velocity, said rod assuming a second position during periods of changing vehicle velocity, and stop means extending from said one end and registering with said detent means aperture in said detent means when said rod is in the first position and bearing against said detent means when said rod is in the second position to maintain said portion within said detent means aperture.

References Cited

UNITED STATES PATENTS

| | | | |
|---|---|---|---|
| 2,873,794 | 2/1959 | Leslie et al. | 297—379 |
| 2,908,530 | 10/1959 | Sanderson | 296—65 |
| 2,952,490 | 9/1960 | Pfaff | 296—65 |
| 3,339,976 | 9/1967 | Karl | 297—379 |

LEO FRAGLIA, *Primary Examiner.*

L. D. MORRIS, JR., *Assistant Examiner.*

U.S. Cl. X.R.

297—379